Patented Nov. 4, 1947

2,430,182

UNITED STATES PATENT OFFICE 2,430,182

PROCESS OF TREATING OIL REFINERY WASTE

Philip J. McGuire, San Francisco, Frank W. Brittain, Piedmont, and Elizabeth D. Rollins, Berkeley, Calif., assignors to Oliver United Filters Incorporated, Oakland, Calif., a corporation of Nevada No Drawing. Application December 26, 1944, Serial No. 569,922

3 Claims. (Cl. 252—322)

This invention relates to a process for treating oil refinery waste sludge, more generally referred to as pond slurry.

Oil refinery waste consists of all the petroleum products, chemicals, refuse and dirt which normally pass into the sewer system of an oil refinery. To effect a partial separation of the oil, water and solids, the waste is progressively settled in a series of settling ponds, the oil being drawn off from the top strata and the water from the next succeeding strata. The settled sludge or pond slurry is then dredged from the settling ponds and conveyed to slurry storage ponds where it simply stands awaiting the development of some process by which it can be further treated for the purpose of recovering from it some or all of its oil content and for putting its solid content in a condition whereby it can be put to some useful purpose, or at least disposed of. For example, one major oil company in California has an estimated accumulation of about 100,000 barrels of pond slurry and is producing it at the rate of 14,000 barrels per year.

The problem of disposing of pond slurry is an acute one of long standing and one on which a great deal of research work has been carried on. The problem has proved to be particularly difficult for the reason that the oil and water content of the slurry is in the form of an emulsion, apparently due to the dirt present, and all known methods of breaking emulsions, including the use of electrical and chemical demulsifiers, have proved to be ineffective and uneconomical. All oil companies are confronted with the same problem.

The object of this invention is the provision of a process for treating oil refinery pond slurry for the purpose of extracting from it an additional quantity of free oil and water and for putting its solid content in a condition whereby it can be used and disposed of as a filling material.

Briefly, the process of our invention comprises cutting a body of oil refinery waste sludge with a diluent having substantially the same characteristics as the oil content of the sludge and agitating the diluted sludge sufficiently to produce a homogeneous mass substantially free of lumps. The sludge so treated is then subjected to the action of a precoat filter of the type disclosed in the Weineke Patent Number 2,083,887 of June 15, 1937. Preferably the precoat used consists of diatomaceous earth such as sold under the trade name "Supercel." Although the oil content of the sludge is in the form of an emulsion when it is delivered to the filter tank, in passing through the precoat the emulsion is broken and consequently the filtrate consists of a mixture of free oil and water. The filtrate is then subjected to a settling action for the purpose of segregating its oil and water content and a portion of the free supernatant oil is returned to the system as a cutting agent or diluent for the pond slurry fed to the precoat filter. The rest of the recovered free oil is conveyed to the refinery for further processing, and the water content of the filtrate is sufficiently free of oil so that it can be dumped into the main sewer system (not the refinery sewer system). The filter cake, which consists of oil saturated dirt and filter aid, is sufficiently dry and rigid to be used and disposed of as a fill material for roads and other construction projects.

Although the pond slurries from all oil refineries have more or less the same characteristics (a thick, black, lumpy, fluid mass having the appearance of thick oatmeal mush cooked with an insufficient amount of water) their consistency varies to some extent and consequently the amount of diluent required to be added to any particular slurry will likewise vary. However, the diluent should be added and intimately mixed with the slurry in an amount sufficient to reduce all of the lumps contained in it and to produce a substantially creamy homogeneous mass. For this purpose, Diesel or fuel oil can be used effectively during the initial stages of the process and then the oil segregated from the filtrate, as above described.

By way of example, one slurry of this general type treated in accordance with our method and obtained from a slurry pond of one of the major oil companies, had a specific gravity of 1.2 and roughly contained about 26% of oil by volume, having a gravity of 28-29° A. P. I., 44% water by weight and 31% dirt by weight. In treating this slurry in accordance with the above method, it was cut and thoroughly mixed with four parts of Diesel fuel oil (31-32° gravity A. P. I.) to every ten parts of slurry and then filtered on an Oliver Precoat filter having a precoat of standard Supercel. The resulting filtrate, consisting of free oil and water, was separated by subjecting it to a settling action. An approximate analysis of samples from the settled filtrate and filter cake indicate that 50% of the oil originally contained in the slurry was recovered as free oil having a gravity of about 30° A. P. I. The filter cake contained about 20% oil by weight 26-27% water by weight and 53-54% solids by weight.

Although this method is a very simple one, it is the only one so far developed capable of effectively and economically breaking the emulsions contained in pond slurries and should therefore go a long way in disposing of the enormous quantities of these slurries now being held in ponds all over the country.

We claim:

1. A method of treating oil refinery pond slurry comprising: mixing a body of said slurry with an oil having substantially the same characteristics as the oil contained in the slurry in an amount sufficient to produce a smooth creamy mass substantially free of lumps; subjecting the slurry so treated to the action of a continuous rotary drum precoat filter and then settling the resultant filtrate to stratify its free oil and water content.

2. A method of treating oil refinery pond slurry comprising: mixing a body of said slurry with an oil having substantially the same characteristics as the oil contained in the slurry in an amount sufficient to produce a smooth creamy homogeneous mass substantially free of lumps; subjecting the slurry so treated to the action of a continuous rotary drum precoat filter; settling the resultant filtrate to stratify its free oil and water content and returning a portion of the free oil to an additional body of slurry to be treated.

3. A method of breaking an emulsion contained in oil refinery pond slurry comprising: mixing a body of said slurry with an oil having substantially the same characteristics as the oil content of said emulsion in an amount sufficient to produce a smooth creamy mass substantially free of lumps; subjecting the slurry so treated to the action of a continuous rotary drum precoat filter and then settling the resultant filtrate to stratify its free oil and water content.

PHILIP J. McGUIRE.
FRANK W. BRITTAIN.
ELIZABETH D. ROLLINS.

REFERENCES CITED

The following references are of record in the file of this patent:

UNITED STATES PATENTS

| Number | Name | Date |
| --- | --- | --- |
| Re. 15,871 | Dyer et al. | July 15, 1924 |
| 1,501,877 | Zoul | July 15, 1924 |
| 1,547,712 | Zoul | July 28, 1925 |
| 1,573,389 | Gates | Feb. 19, 1926 |
| 1,807,833 | Eddy | June 2, 1931 |
| 2,195,833 | Wirth | Apr. 2, 1940 |
| 2,324,763 | Carruthers | July 20, 1943 |